United States Patent
Bosen

(10) Patent No.: US 8,113,798 B2
(45) Date of Patent: Feb. 14, 2012

(54) TURBOMACHINE WITH TILT-SEGMENT BEARING AND FORCE MEASUREMENT ARRANGEMMENT

(75) Inventor: Werner Bosen, Cologne (DE)

(73) Assignee: Atlas Copco Energas GmbH, Cologne (DE)

( * ) Notice: Subject to any disclaimer, the term of this patent is extended or adjusted under 35 U.S.C. 154(b) by 268 days.

(21) Appl. No.: 11/901,082

(22) Filed: Sep. 14, 2007

(65) Prior Publication Data

US 2008/0095610 A1 Apr. 24, 2008

(30) Foreign Application Priority Data

Oct. 20, 2006 (DE) .......................... 10 2006 049 516

(51) Int. Cl.
- F04D 29/041 (2006.01)
- F16C 17/06 (2006.01)
- F01D 3/00 (2006.01)
- G01L 5/12 (2006.01)

(52) U.S. Cl. ........ 417/365; 417/407; 384/306; 415/104; 73/862.49

(58) Field of Classification Search .................. 417/407, 417/365, 423.12; 384/306, 307, 308; 415/104; 73/862.49

See application file for complete search history.

(56) References Cited

U.S. PATENT DOCUMENTS

| | | | | |
|---|---|---|---|---|
| 1,117,504 A | * | 11/1914 | Kingsbury | ..................... 384/307 |
| 1,293,471 A | * | 2/1919 | Kingsbury | ..................... 384/125 |
| 1,998,450 A | * | 4/1935 | Davis | ........................ 73/862.49 |
| 3,033,031 A | * | 5/1962 | Gruber | ........................ 73/862.49 |
| 3,087,330 A | * | 4/1963 | Metzmeier | .................. 73/862.49 |
| 4,273,390 A | * | 6/1981 | Swearingen et al. | ......... 384/307 |
| 4,287,758 A | * | 9/1981 | Swearingen | .............. 73/862.49 |
| 4,472,107 A | * | 9/1984 | Chang et al. | .................. 415/104 |
| 4,578,018 A | | 3/1986 | Pope | |
| 4,827,170 A | * | 5/1989 | Kawamura et al. | ...... 310/156.28 |
| 4,900,165 A | * | 2/1990 | Kun et al. | ..................... 384/220 |
| 5,248,239 A | * | 9/1993 | Andrews | ........................ 415/104 |
| 5,312,190 A | * | 5/1994 | Vohr | ............................. 384/306 |
| 5,567,057 A | * | 10/1996 | Boller | ........................... 384/122 |
| 5,741,116 A | * | 4/1998 | Hudson | ......................... 415/104 |

(Continued)

FOREIGN PATENT DOCUMENTS

| | | |
|---|---|---|
| DE | 196 30 244 | 1/1998 |
| DE | 100 03 018 | 7/2001 |
| DE | 101 38 056 | 2/2003 |
| DE | 103 46 647 | 5/2005 |

(Continued)

OTHER PUBLICATIONS

Grote, K. H. et al., "Taschenbuch für den Maschinenbau" (Pocketbook of Mechanical Engineering), 21$^{st}$ edition, 2005, pp. G100 to G102. (Spec, p. 8).

Primary Examiner — Devon C Kramer
Assistant Examiner — Nathan Zollinger
(74) Attorney, Agent, or Firm — Collard & Roe, P.C.

(57) ABSTRACT

A turbomachine has a housing and a rotor mounted radially and axially in the housing. The rotor has a shaft and at least one impeller attached to the shaft. Two tilt-segment bearings having tilt segments, which bearings act in opposite directions, are provided for axial mounting of the rotor. The bearings interact with an assigned contact surface of the shaft. At least one of the tilt segments has a force measurement device for direct detection of the axial force acting on the assigned tilt segment. The force measurement devices are connected with an electronic control device.

7 Claims, 2 Drawing Sheets

U.S. PATENT DOCUMENTS

| | | | |
|---|---|---|---|
| 6,050,727 A * | 4/2000 | Messmer et al. | 384/99 |
| 6,499,883 B2 * | 12/2002 | Miller | 384/117 |
| 6,517,311 B2 | 2/2003 | Funke | |
| 6,616,423 B2 | 9/2003 | Bosen | |
| 6,692,224 B2 * | 2/2004 | Miura et al. | 415/66 |
| 6,729,858 B2 * | 5/2004 | Choi et al. | 417/365 |
| 6,957,945 B2 * | 10/2005 | Tong et al. | 415/1 |
| 7,156,627 B2 | 1/2007 | Lenderink et al. | |
| 2005/0042105 A1 * | 2/2005 | Nishiyama et al. | 416/183 |

FOREIGN PATENT DOCUMENTS

| | | |
|---|---|---|
| DE | 10 2004 028 125 | 3/2006 |
| EP | 1 008 773 | 6/2000 |
| GB | 1 105 658 | 3/1968 |
| GB | 2395231 A * | 5/2004 |
| SU | 806 884 | 2/1981 |
| SU | 1 059 227 | 12/1983 |
| SU | 1 257 247 | 9/1986 |
| SU | 1 677 376 | 9/1991 |

\* cited by examiner

TURBOMACHINE WITH TILT-SEGMENT BEARING AND FORCE MEASUREMENT ARRANGEMMENT

BACKGROUND OF THE INVENTION

1. Field of the Invention

The invention relates to a turbomachine having a housing and a rotor mounted radially and axially in the housing. The rotor has a shaft and at least one impeller attached to the shaft. The turbomachine can be structured as a rapidly running flow machine with axial or radial through-flow, and serves for transport, expansion and/or compression of a medium.

2. The Prior Art

A turbomachine structured as a turbocompressor, having the characteristics described above, is described in German Patent No. DE 100 03 018 A1. The rotor is formed from a shaft and an impeller of the turbocompressor disposed at one shaft end, in an overhung manner. The shaft, which can be driven by a gear mechanism, is mounted in the housing on radial slide bearings. Simple slide rings are provided on the shaft to guide the shaft. The rings are disposed on both sides of a gear mechanism pinion of the shaft, and act together with ring surfaces of a drive gear wheel as axial thrust limiters. In order to compensate for the forces that act on the shaft in the axial direction, a pressure chamber is provided at the end of the shaft that lies opposite the impeller. The pressure prevailing there exerts a force that acts on the shaft in the axial direction. In order to compensate for the axial forces that act on the shaft as much as possible, the pressure in the pressure chamber is regulated as a function of the pre-pressure of the turbocompressor. Since the indirect determination of the axial force from the prevailing pre-pressure is subject to a certain amount of uncertainty, increased friction wear of the axial guide can occur, since it is typically not suitable for absorbing great axial forces. Furthermore, the relationships between pre-pressure and the resulting axial force must be determined for every type of machine, in a complicated manner, since they are greatly dependent on the design conditions of the turbomachine. Finally, rapid changes in the operational state also cannot be compensated, due to the inertia of the system, and can lead to destruction of the axial guide formed from slide rings.

German Patent No. DE 101 38 056 A1 relates to a turbomachine having an expansion turbine stage and a turbocompressor stage. The rotor is formed by an impeller of the expansion turbine stage, an impeller of the turbocompressor stage, and a shaft. The impellers are each disposed in an overhung manner on a shaft end, and radial flow can take place through them. The shaft is mounted in the housing on roller bearings, and a force measurement device is disposed between a bearing ring of a roller bearing and an assigned contact surface of the housing. To compensate the forces that act on the roller bearings in the axial direction, a sealed pressure chamber is formed between the back of the impeller and the adjacent housing surface, at least on the back of one of the impellers. The pressure in the pressure chamber is regulated as a function of the measurement value of the force measurement device, in order to compensate the axial forces that act on the shaft. Mounting of the rapidly rotating rotor of the turbomachine requires a precisely aligned and therefore complicated orientation of the roller bearings in the housing. The expansion of the housing in case of temperature variations or temperature gradients during operation of the turbomachine must also be taken into consideration. While the roller bearings shown are suitable for absorbing great forces in the radial direction, even comparatively slight axial stresses can already lead to destruction of the roller bearings.

A single-stage compressor is described in U.S. Pat. No. 5,741,116, the shaft of which is connected with an impeller on one end. Furthermore, two bearing rings as well as two tilt segment bearings assigned to the bearing rings are disposed on the shaft. The two tilt segment bearings each work together with an assigned contact surface. Furthermore, two spring elements are disposed between the two contact surfaces and the compressor housing, around the shaft. Axial forces that act non-uniformly on the impeller are transferred to the bearing rings by way of the shaft, and passed on to the tilt segment bearings. The tilt segment bearings pass these axial forces on to the contact surfaces, from where they are transferred to the spring elements. The spring elements pass the axial forces on to the compressor housing, in which they are deflected axially in proportion to the force acting on them. If a bearing ring is subject to too much stress, the spring element assigned to this bearing ring is therefore deflected more than the other, so that the load is displaced onto the second bearing ring.

U.S. Pat. No. 4,578,018 relates to a gas turbine having a device for balancing out a non-uniform axial pressure that acts on the turbine rotor. In operation, the rotor is exposed to forces that engage axially, which occur due to static or dynamic forces on the various components of the rotor. The axial pressure is transferred to the bearing housing and the machine frame elements by the rotor and an axial slide bearing arrangement. In this connection, the amount of the axial pressure can be recorded by an expansion measurement device affixed to the bearing housing. The signal of this expansion measurement device is amplified and passed on to a regulator that automatically regulates the pressure of a hydraulic fluid that is passed into a pressure chamber behind the rotor, and thus is able to balance out the axial pressure that acts on the rotor.

SUMMARY OF THE INVENTION

It is therefore an object of the invention to provide a turbomachine which has a mounting that is low in friction wear, and which allows a direct determination of the axial force acting on the shaft.

This object is accomplished, according to the invention, in that the rotor is axially mounted on two bearings having tilt segments. The bearings act in opposite directions and each interact with an assigned contact surface of the shaft. At least one of the tilt segments of each bearing has a force measurement device for direct detection of the axial force acting on the assigned tilt segment. The force measurement devices are connected with an electronic control device.

The detection of the axial force (axis shear) that acts on the rotor of the turbomachine is a necessary prerequisite for automatic regulation of a variable that compensates the axial force. Thus, for example, a sealed pressure chamber can be formed between a rotor surface and an assigned housing surface. The pressure chamber is connected with a high-pressure line and a gas outlet by way of a feed line and a pressure regulation valve controlled by the control device. The pressure p that prevails in the pressure chamber exerts a force that acts on the rotor in the axial direction. To compensate the axial force that acts on the rotor, the pressure p that prevails in the pressure chamber is either increased or reduced as a function of the direction of the axis thrust that built up, using the regulation valve. No particularly high requirements are set for the seal of the pressure chamber, within the scope of the invention. It is sufficient if a pressure change is brought about by impacting the pressure chamber with a pressure medium or by letting the pressure medium out of the pressure chamber, using the pressure regulation valve. This pressure change is suitable for compensating the axial force acting on the rotor. Thus, for example, simple labyrinth seals can be provided between the rotor and the housing, in order to seal the pressure chamber. The high-pressure line can be connected with a high-pressure region in the advance region or outlet of a pressure stage of the turbomachine. Then, the working medium of the turbomachine is also used as the pressure medium. Accordingly, the gas outlet can also be connected with a low-pressure region of the turbomachine.

In a preferred embodiment of the invention, the at least one impeller is disposed on one end of the shaft, in an overhung manner, and the pressure chamber is formed between the back of the impeller as the rotor surface and the adjacent housing surface. In this embodiment, the pressure chamber is preferably delimited and sealed by an impeller labyrinth between the back of the impeller and the housing, and a shaft labyrinth between the shaft and the housing. If an impeller disposed in overhung manner is provided at both ends of the shaft, corresponding pressure chambers with an assigned pressure regulation valve can be provided on both impellers, without restriction. The pressure in the pressure chambers is regulated as a function of the measurement values determined with the force measurement devices.

Without restriction, the pressure chamber or several pressure chambers can be disposed in a central segment of the shaft, for example in the region of the tilt segment bearings or at one of the shaft ends, as long as no impeller is provided at the corresponding shaft end. If several pressure chambers are provided, these can be disposed spatially separated from one another, or also directly adjacent, separated by a seal such as a labyrinth seal, without restriction.

From the direct detection of the axial force acting on the tilt segment assigned to the force measurement device, from which the total axial force in effect results by multiplication by the number of tilt segments, an axial bearing overload that is starting to occur and cannot be completely compensated can be recognized in timely manner, and the operation of the turbomachine can be interrupted by the electronic control device. In the case of turbomachines, great pressure variations and therefore severe changes in the axial force on the rotor can occur in a so-called pump limit range, if the flow of the medium being transported in the turbomachine abruptly tears off in the blades of an impeller. According to the invention, such critical operating states can be determined by direct detection of the axial force. Then, the turbomachine can be brought into a more stable operating range or shut off, by regulation interventions.

Tilt segment bearings are generally known from practice and are described, for example, in Dubbel, Taschenbuch für den Maschinenbau [Pocketbook of Mechanical Engineering], 21st edition, 2005, pages G 100 to G 102, the disclosure of which is herein incorporated by reference. The tilt segment bearings typically have between four and twelve individual tilt segments, which are disposed around the circumference of the tilt segment bearing. The individual tilt segments are supported in the direction of rotation, so that they can move to tilt, by way of a support point, and a lubricant medium is applied to them. Because of the relative movement between the tilt segments of the tilt segment bearing, the assigned contact surface, and the lubricant medium present in the gap that lies between them, hydrodynamic lubrication occurs, and the individual tilt segments stand at a slant, in wedge shape, because of the flow conditions. According to the invention, the two tilt segment bearings, which act in opposite directions, have at least one tilt segment having a force measurement device, in each instance. The direction and the amount of the axial force that is in effect, in total, can be determined from a comparison of the two force values determined by the control device, independent of the speed of rotation of the rotor and of the precise configuration of the force measurement devices, directly and with very great accuracy.

The further design configuration can be freely selected, to a great extent, within the framework of the invention. Thus, drive and power take-off of the rotor can take place by means of one or more impellers of an expansion turbine, a toothed gear mechanism, an integrated electric motor, a flexible clutch, or a combination of these power take-off means. According to the invention, at least one impeller is provided as a power take-off and/or as a drive. Preferably, an impeller is provided at opposite ends of the shaft, and one of the impellers is assigned to a turbocompressor stage, and driven, by way of the shaft, by the other impeller, assigned to an expansion turbine stage. In order to feed additional power to the turbomachine, or derive power from it, a gear mechanism connector or an integrated electrical machine can also be provided.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
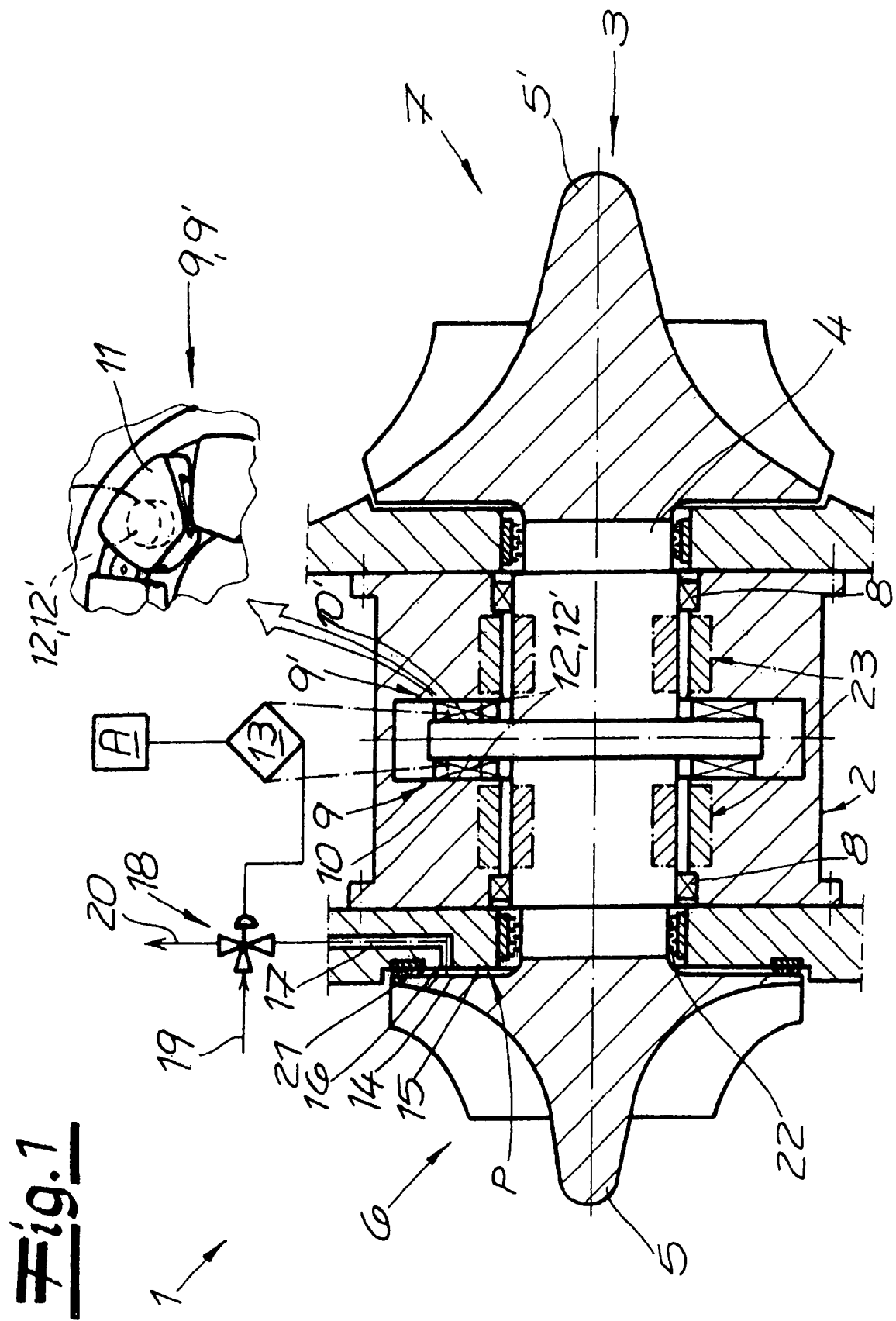
FIG. 1 shows a cross-sectional view of a turbomachine according to the invention.

Referring now in detail to the drawings, FIG. 1 shows a turbomachine 1 having a housing 2 and a rotor 3 mounted in the housing 2, which has a shaft 4 and impellers 5, 5' disposed at the ends of shaft 4, in an overhung manner. One impeller 5 is assigned to an expansion turbine stage 6, and the other impeller 5' is assigned to a turbocompressor stage 7. Rotor 3 is held in housing 2, with shaft 4, on two radial bearings 8 and two hydrodynamic tilt segment bearings 9, 9' that act in opposite directions, as axial bearings. Tilt segment bearings 9, 9' each work together with an assigned contact surface 10, 10' of shaft 4. At least one of tilt segments 11 of each tilt segment bearing 9, 9' has a force measurement device 12, 12' for direct detection of the axial force that acts on assigned tilt segment 11, force measurement device 12, 12' is connected to an electronic control device 13. The measurement value determined by force measurement device 12, 12' proportionally reproduces the force acting on the bearing, in accordance with the total number of tilt segments 11, per tilt segment bearing 9, 9'. The direction and the amount of the total axial force acting on rotor 3 can be precisely determined from a comparison of the two measurement values for the two tilt segment bearings 9, 9'. If the direction of the total axial force points towards expansion turbine stage 6, the corresponding force measurement device 12 will be impacted more strongly; if the axial force acting on rotor 3 reverses its direction towards turbocompressor stage 7, the other force measurement device 12' will be impacted more strongly, accordingly.

In order to minimize the axial force that is in effect, a pressure chamber 16 is formed between impeller back 14 of impeller 5 of expansion turbine stage 6, and adjacent housing surface 15, and pressure chamber 16 is connected with a high-pressure line 19 and a gas outlet 20 by way of a feed line 17 and a pressure regulation valve 18 controlled by control device 13. The pressure p that prevails in pressure chamber 16 exerts a force that acts in the axial direction on the rotor 3. Pressure chamber 16 is delimited and sealed by an impeller labyrinth 21 between impeller back 14 and housing 2, and a shaft labyrinth 22 between shaft 4 and housing 2. To minimize the axial force that acts on rotor 3, the pressure p in pressure chamber 16 is increased or reduced as a function of the measurement values of the force measurement devices 12, 12', by pressure regulation valve 18. Alternatively or in addition, a corresponding pressure chamber can also be provided in the region of turbocompressor stage 7. In order to provide power to or remove power from turbomachine 1, which is configured as a turboexpander, as needed, an electrical machine 23 that is optionally configured as a motor or a generator can be provided.

Figure 2:
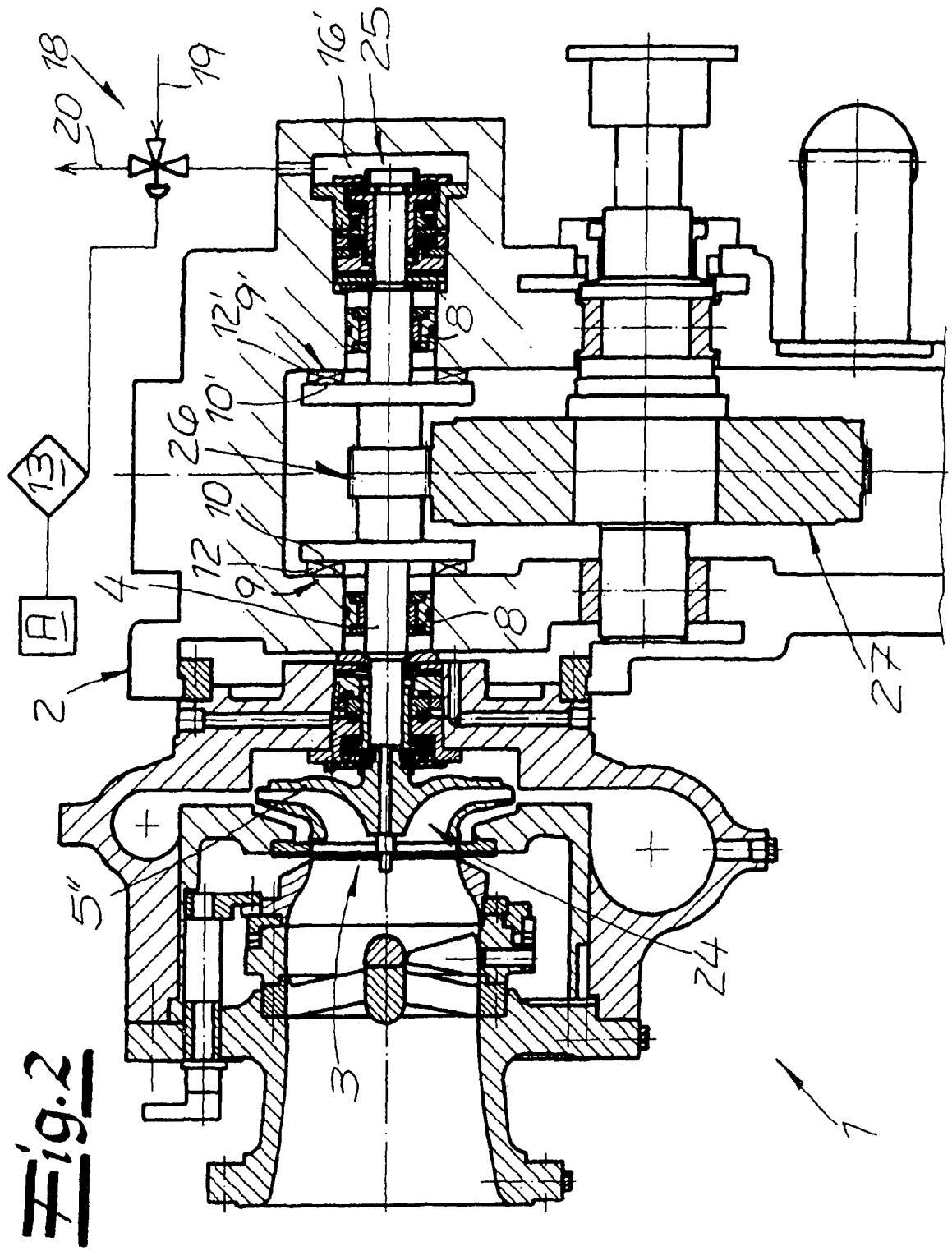
FIG. 2 shows a cross-sectional view of an alternative embodiment of a turbomachine according to the invention.

FIG. 2 shows another embodiment of a turbomachine 1 structured as a turbocompressor, whereby rotor 3 has only one impeller 5" of a compressor stage 24 disposed in overhung manner. A sealed pressure chamber 16' is disposed on shaft end 25 of shaft 4 that lies opposite the impeller 5", which chamber acts on the assigned shaft end 25 and is connected to a pressure regulator valve 18, as also in FIG. 1. The regulation of the pressure regulation valve 18 takes place as described above, by means of the electronic control device 13, to which the force measurement devices 12, 12' according to the invention are also connected, for direct detection of the axial force. For a display of the operating parameters, a display element A is connected with control device 13, as in the embodiment according to FIG. 1. Rotor 3 has a gear tooth system engagement 26 and is driven by a gear mechanism 27. Aside from an electrical machine 23 as shown in FIG. 1 and a gear mechanism 27 according to FIG. 2, a connection to a flexible clutch can also be used as a power take-off or drive.

Accordingly, while only a few embodiments of the present invention have been shown and described, it is obvious that many changes and modifications may be made thereunto without departing from the spirit and scope of the invention.

What is claimed is:

1. A turbomachine comprising:
   a housing;
   a rotor mounted radially and axially in the housing, said rotor having a shaft and at least one impeller attached to the shaft;
   two radial bearings, said bearings being adapted to mount the rotor in the housing;
   two tilt segment bearings having tilt segments and acting in opposite directions, said tilt segment bearings adapted to axially mount the rotor in the housing, wherein each of said tilt segment bearings interacts with an assigned contact surface of the shaft;
   at least two force measurement devices, wherein for each of said two tilt segment bearings acting in opposite directions, at least one of said force measurement devices is provided, wherein said force measurement devices operate independently of each other and are each assigned to a single tilt segment of a corresponding tilt segment bearing and directly detect axial force acting on the corresponding tilt segment;
   an electronic control device connected to each force measurement device, said electronic control device being adapted to determine a direction and amount of the axial force from a comparison of determined force values for the two tilt segment bearings, and
   a sealed pressure chamber formed between a rotor surface and an assigned housing surface, said pressure chamber being connected with a high-pressure line and a gas outlet by way of a feed line and a pressure regulation valve controlled by the electronic control device,
   wherein pressure (p) that prevails in the sealed pressure chamber exerts a force that acts on the rotor in an axial direction, and
   wherein the pressure in the pressure chamber is increased or reduced as a function of the measurement values of the force measurement devices, by the pressure regulation valve to minimize axial force acting on the rotor.

2. A turbomachine according to claim 1, wherein the impeller is disposed overhung on one end of the shaft, and wherein the sealed pressure chamber is formed between the rotor surface of an impeller back side and an adjacent housing surface.

3. A turbomachine according to claim 2, wherein the sealed pressure chamber is delimited and sealed by an impeller labyrinth between the impeller back side and the housing, and by a shaft labyrinth between the shaft and the housing.

4. A turbomachine according to claim 1, wherein the rotor has an impeller at each end of the shaft.

5. A turbomachine according to claim 4, wherein at least one impeller is formed as a drive of an expansion turbine stage, or at least one impeller is formed as a power take-off of a turbocompressor stage.

6. A turbomachine according to claim 1, wherein the shaft is connected with a gear mechanism.

7. A turbomachine according to claim 1, further comprising an electrical machine disposed in the housing and connected with the shaft, said electrical machine being configured as a drive motor or generator.

* * * * *